INVENTOR
WILLIS B. ENSINGER

BY
ATTORNEYS

United States Patent Office 2,711,356
Patented June 21, 1955

2,711,356

BEARING CONSTRUCTION FOR HIGH SPEED ROTORS

Willis B. Ensinger, Silver Spring, Md.

Application June 30, 1952, Serial No. 296,518

11 Claims. (Cl. 308—178)

(Granted under Title 35, U. S. Code (1952), sec. 266)

This invention relates to bearing assemblies and more particularly to bearing assemblies for high speed rotors such as are commonly employed in gyroscopes and the like.

In the operation of compact high speed precision instruments such as gyroscopes, it is important that the rotor shaft bearing surface and bearing assemblies be micrometrically aligned and that the loading applied to the bearings remain constant at all times so that the operational characteristics of the gyroscope remain uniform. One of the factors adversely affecting the loading and alignment is a variation in length of the shaft or rotor hub due to a temperature rise within the parts which causes the components making up the gyro to expand. Expansion or contraction of a component may cause the friction between the bearing surfaces to change to such an extent as to materially vary the speed of rotation, or to allow axial shifting of the shaft thereby resulting in a dynamic unbalance of the gyro. In either event the effect is prejudicial to absolute accuracy in the operation of the gyro and the accomplishment of its intended purpose.

In applying this invention to such instruments as gyroscopes, it is proposed to provide self-aligning bearing assemblies which are closely fitted within aligning sleeves forming part of a gimbal housing. A tension strut assembly for applying preloading pressure between the bearing assembly and rotor shaft passes through the shaft and bearing assemblies and at each end engages the gimbal housing. The tension strut assembly being subjected to the same temperature variation as the shaft compensates for any expansion or contraction of the shaft due to temperature conditions by expanding and contracting at the same rate as the shaft.

With this in view, it is an object of this invention to provide a bearing assembly in which the bearing loading or preloading pressure remains constant regardless of the temperature conditions.

Another object is the provision of a rotor shaft and bearing assembly in which the static balance of the combination remains constant regardless of the expansion or contraction of the rotor shaft.

Still another object is the provision of a self-aligning bearing assembly.

Yet another object is the provision of a gyroscope assembly in which the rotor shaft and bearing assembly may be initially preloaded and the gyroscope may thereafter be statically balanced without disturbing the preloading.

Figure 1:
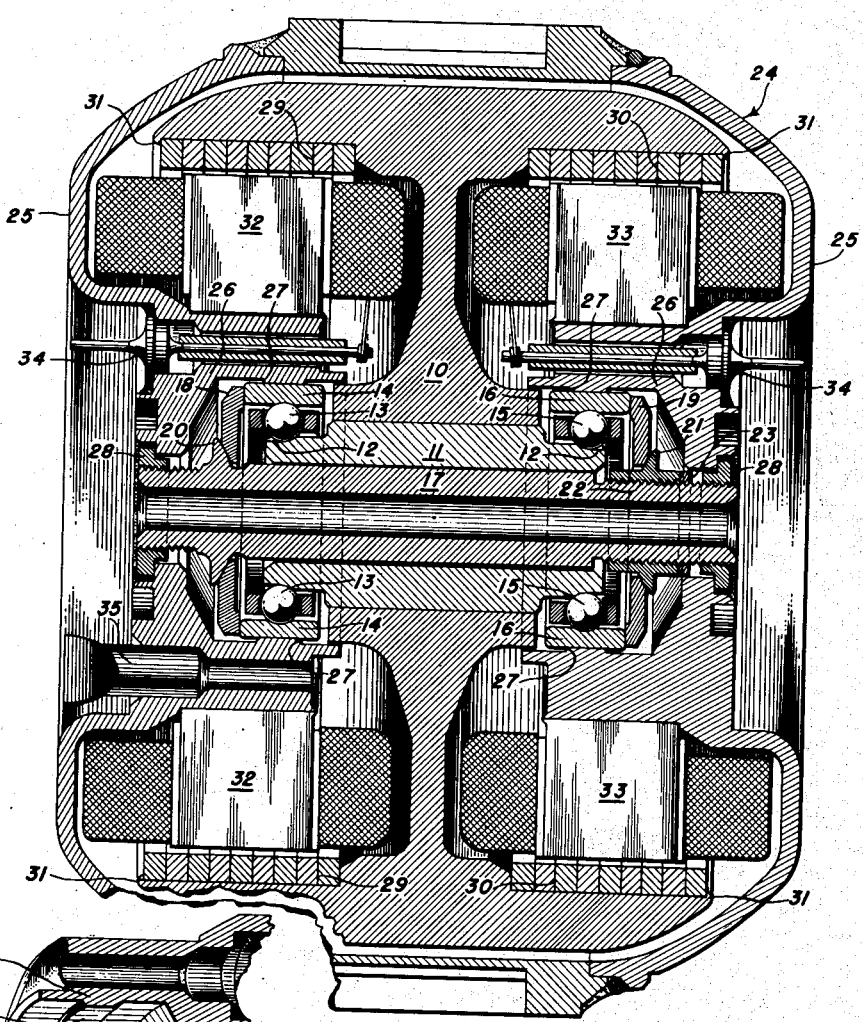
Figure 2:
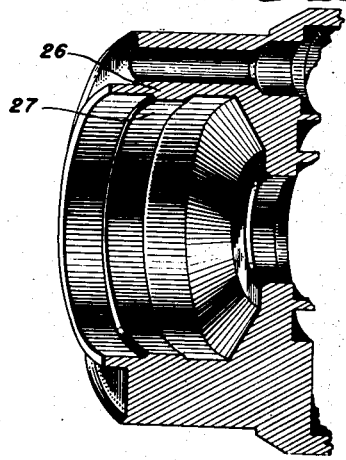

These and other objects and advantages will become apparent from the following specification and drawings in which:

Fig. 1 is a cross-sectional view taken through the spin axis of a gyroscope embodying the present invention; and Fig. 2 is an enlarged perspective view, in section, of the aligning sleeve which forms part of the gyro housing.

Referring now to the drawings, wherein like numerals designate like parts, there is disclosed in Fig. 1 a gyroscope comprising a rotor 10 rigidly secured to a hollow rotor shaft 11 whose ends are each provided with a bearing race 12 adapted for high speed rotation in a pair of bearing assemblies, one of which includes ball bearings 13 and outer race 14 and the other includes ball bearings 15 and outer race 16. Ball bearings 13 and 15 are urged into contact with bearing races 12 of the shaft 11 by means of an adjustable tension strut assembly 17 which passes freely through the shaft and bearing assemblies. Thus, the loading or preloading between the bearings 13 and 15 and the shaft 11 may be adjusted by relative movement of the bearings and shaft which causes the bearings to be seated on races 12 to increase the preloading. This relative movement is brought about by annular plates 18 and 19 which are mounted about the strut 17 whose outer peripheries engage races 14 and 16 respectively, and whose inner peripheries contact flanges 20 and 21 respectively, and form partial ball and socket joints therewith. As shown flange 20 may be formed integral with the strut 17 whereas the flange 21 may be part of a threaded sleeve 22 which encompasses a threaded portion of the strut for longitudinal adjustment thereon. The force produced by the movement of the adjusting flange 21 is transmitted to the races 14 and 16 through the plates 18 and 19 respectively, and is evenly distributed thereto because of mating arcuate contacting surfaces on the flanges and the plates which permit the plates to assume any number of angular positions between limits and thus to be in annular contact with the sides of the races 14 and 16 at all times.

After the desired preloading pressure between the bearings 13 and 15 and shaft 11 has been attained the threaded sleeve 22 may be locked in position by a locknut 23 and the assembled rotor shaft bearing assemblies and tension strut may be inserted within a gyro or a gimbal housing 24. The gimbal housing 24 is comprised of a pair of gimbal caps 25 which are formed with inwardly extending aligning sleeves 26 having annular aligning pads 27 for accommodating the bearing assemblies. The bearing races 14 and 16 are supported by the aligning pads 27 which permit shifting of the races when they are assembled so that their internal bearing grooves are perpendicular to the axis of rotation of the rotor 10. This angular shift, or tilt is relatively slight so that the bearing races are initially aligned by the cooperation between plate 18 and flange 20 and plate 19 and flange 21 on the shaft 11 as preloading pressure is applied. However, this micrometric automatic adjustment is important to the proper functioning and long operational life of the gyro. If the races are not properly aligned the bearings 13 and 15 seek new paths of rotation and, at the high speed range in which the gyro operates, new grooves in the races are rapidly formed to in turn vary the preloading between the bearings and shaft 11 which introduces axial shifts in the shaft to thus unbalance the gyro dynamically and statically. This unbalanced condition affects the operational characteristics of the gyro, causes considerable wear on the bearing assembly and soon renders the gyro effectively inoperative. The preloading between the bearings 13 and 15 and shaft 11 is not affected by this final alignment but is maintained constant by the plates 18 and 19 which automatically adjust themselves to any position assumed by the bearing races 14 and 16 by moving along the arcuate surfaces of the flanges 20 and 21.

The tension strut 17 is mounted on the gimbal caps 25 and is movable relative thereto to statically balance the gyro by means of nuts 28 which are adjustable on the threaded ends of the strut 17. Adjustment of these nuts 28 moves the assembled shaft, bearing assemblies and strut as a unit within the gimbal housing 24 to statically balance the gyro without disturbing the degree of preloading on the bearings or the alignment of the bearing outer races.

In the embodiment illustrated the gyro rotor 10 is driven by two hysteresis motors having laminated poles 29 and 30 mounted on the gyro rotor and held in position by spun over edges 31 of the rotor. The motor stators include the usual iron cores 32 and 33. Polyphase electrical leads may be brought into the casing 24 by means of insulated headers 34 in each gimbal cap 25. These headers 34 are preferably sealed to the housing 24 as are all the joints in the housing so that the housing is made gas tight. If desired the air within the housing may be withdrawn through an evacuating tube 35 projecting from the casing 24 and a dry inert gas such as nitrogen may be introduced through the tube at any desired pressure whereupon the tip of the tube may be crimped and sealed with solder.

While the device disclosed herein is a preferred embodiment of the invention it is to be understood that the invention may be embodied in other forms without departing from the spirit and scope of the invention as defined by the appended claims.

The invention described herein may be manufactured and used by or for the Government of the United States of America for governmental purposes without the payment of any royalties thereon or therefor.

What is claimed is:

1. In combination, a pair of supports each having an aligning sleeve with an annular pad mounted thereon, bearing assemblies mounted on said supports on said pads, a rotatable shaft mounted on said bearing assemblies, a tension strut passing through said bearing assemblies and shaft and engaging said supports, means on said strut in surface contact with said bearing assemblies to impose a preloading pressure upon the bearing assemblies and to thereby maintain a constant preloading pressure on said bearing assemblies over a wide range of temperature variation, said tension strut having the same rate of expansion and contraction as the rotatable shaft.

2. In combination, a pair of supports each having an aligning sleeve with an annular aligning pad mounted thereon, a plurality of bearing assemblies slidably mounted on said supports on said pads, annular plates in engagement with said bearing assemblies and respectively having an inclined bearing surface thereon, a rotatable shaft mounted on said bearing assemblies, a tension strut passing through said bearing assemblies and shaft and engaging said supports, flanges having inclined arcuate bearing surfaces in cooperative engagement with the inclined bearing surfaces on said annular plates, said flanges being carried on said strut to adjust a preloading pressure between the bearing assemblies and the shaft and to account for micrometric canting of the bearing assemblies on the pads of the supports to thereby maintain a constant preloaded pressure on said bearing assemblies over a wide range of temperature variation, said tension strut having the same rate of expansion and contraction as said shaft, and means to move the preloaded shaft and bearing assemblies relative to said supports to statically balance the combination without disturbing the preloaded condition.

3. In a gyroscope, a pair of supports, bearing assemblies slidably mounted on said supports, a rotatable shaft mounted between the bearing assemblies, a tension strut passing through said bearing assemblies and shaft and mounted on said supports, a flange having an inclined bearing surface on said strut, an annular plate cooperatively engaging with the inclined bearing surface of said flange and in engagement with one of the bearing assemblies, an adjustable flange member having an inclined bearing surface mounted on the strut, a second annular plate in engagement with the inclined bearing surface of said adjustable flange and in contact with the other bearing assembly to adjust a preloading pressure between the bearing assemblies and the shaft and to thereby maintain a constant preloaded pressure on said bearing assemblies over a wide range of temperature variation, said tension strut having the same rate of expansion and contraction as said shaft.

4. In a gyroscope, a pair of supports each having an aligning sleeve with an annular aligning pad mounted thereon and spaced intermediate the sleeve, bearing assemblies slidably mounted on said supports and on said pads, a rotatable shaft mounted between the bearing assemblies and forming a bearing surface therewith, a tension strut passing freely through said bearing assemblies and shaft and mounted on said supports, a flange having an inclined bearing surface on one end of said strut, an annular plate cooperatively engaging with the inclined bearing surface of said flange and in engagement with one of the bearing assemblies, an adjustable flanged member having an inclined bearing surface mounted on the other end of the strut, a second annular plate in engagement with the inclined bearing surface of the adjustable flanged member and in contact with the other bearing assembly to adjust a preloading pressure on the bearing assemblies and to maintain a constant preloading on the bearing assemblies over a wide range of temperature variation, said tension strut having the same rate of expansion and contraction as said shaft, and means to move the preloaded shaft and bearing assemblies relative to the supports to statically balance said device without disturbing the preloading.

5. In a high speed rotation device, a pair of supports each having an aligning sleeve with an annular aligning pad spaced intermediate the sleeve, bearing assemblies slidably mounted within said sleeves and supported on the pads, a rotatable shaft mounted between the bearing assemblies and forming a bearing surface therewith, said bearing assemblies micrometrically tiltable on the pads to automatically align the shaft and the bearing assemblies, a tension strut passing freely through said bearing assemblies and shaft and mounted on said supports, means on said strut to adjust a preloading pressure directly on the bearing assemblies and for maintaining a constant preloading on the bearing assemblies over a wide range of temperature variation, said tension strut having the same rate of expansion and contraction as said shaft.

6. In a high speed rotation device, a pair of supports, an aligning sleeve on each of the supports, an annular aligning pad in each aligning sleeve, bearing assemblies slidably mounted within said sleeves and supported on the pads, a rotatable shaft mounted between the bearing assemblies and forming a bearing surface therewith, said bearing assemblies micrometrically tiltable on the pads to automatically align the shaft and the bearing assemblies, a tension strut passing freely through said bearing assemblies and shaft and mounted on the supports, means on the strut to adjust a preloading pressure on the bearing assemblies and to maintain a constant preloading pressure on the bearing assemblies over a wide range of temperature variation, said tension strut having the same rate of expansion and contraction as said shaft, and a second means on the strut to move the preloaded shaft and bearing assemblies relative to the supports to statically balance the device without disturbing the preloading.

7. In a high speed rotation device, a pair of supports, aligning sleeves extending inwardly from said supports for a considerable distance, annular aligning pads in each of the sleeves, said pads being in axially overhanging relation to said supports, bearing assemblies slidably mounted within said sleeves and supported on the pads, a rotatable shaft mounted between the bearing assemblies and forming a bearing surface therewith, said bearing assemblies being tiltable on the pads to automatically align the shaft and the bearing assemblies, a tension strut passing freely through said bearing assemblies and shaft and mounted on said supports, a flange on one end of said strut, an annular plate contacting said flange and in engagement with one of the bearing assemblies, an adjustable flanged member mounted on the other end of the strut, a second annular plate engaging said flanged member and in contact with the other bearing assembly to adjust the preloading pressure on the bearing assemblies and to maintain a constant preloading on the bearing assemblies over a wide range of temperature variation, said tension strut having the same rate of expansion and contraction as said shaft, and means to move the preloaded shaft and bearing assemblies relative to the supports to statically balance the device without disturbing the preloading.

8. A temperature compensating bearing assembly comprising a pair of supports, aligning sleeves mounted on said supports, an annular aligning pad in each of the sleeves, a bearing on each of the supports within said sleeves, a shaft journaled in the bearings, means for preloading the bearings comprising a tension strut having radially extending flanges thereon in bearing relation with the bearing assemblies, the strut being so located as to be subject to the same temperature changes as the shaft whereby temperature changes causing variations in length of the shaft will cause similar variations in the length of the strut so that the bearing preloading pressures are maintained substantially constant said tension strut having the same rate of expansion and contraction as said shaft.

9. A temperature compensating bearing assembly for gyroscopes comprising a pair of supports, a bearing on each of the supports, a shaft journaled in the bearings, a tension strut extending through said bearings, flanges having inwardly inclined bearing surfaces, annular plates in engagement with said bearings and respectively having an outwardly inclined bearing surface in engagement with the respective inwardly inclined bearing surface of the flanges to thereby enable the application of preloading pressures to the bearings by way of the flanges and plates, said inclined bearing surfaces on the flanges to facilitate automatic alignment of the shaft and the bearings during any micrometric tilting of the bearing assemblies within the supports, and means for adjusting the strut to apply a preloading pressure to the bearings, the strut being so located as to be subject to the same temperature changes as the shaft whereby temperature changes causing variations in length of the shaft will cause similar variations in the length of the strut so that the bearing preloading pressures are maintained substantially constant, said tension strut having the same rate of expansion and contraction as said shaft.

10. In a gyroscopic assemblage, a pair of supports each having a cylindrical aligning sleeve mounted thereon with an annular aligning pad intermediate the ends of the sleeve, bearing assemblies each having an outer race in slidable engagement within said sleeve and supported on an aligning pad, a rotatable shaft mounted between the bearing assemblies to form a bearing surface therewith, said races on the bearing assemblies being slidable on said pads, a tension strut passing freely through said bearing assemblies and shaft and mounted on said supports, flanges on each side of said strut having inclined bearing surfaces, an annular plate encircling the inclined bearing surface of each flange and extending radially from said strut to contact the bearing assembly outer race, one of said flanges being adjustably mounted to regulate for a preloading pressure applied on the bearing assemblies through the annular plates and for maintaining a constant preloading on the bearing assemblies over a wide range of temperature variation, said tension strut having the same rate of expansion and contraction as said shaft.

11. In combination, a pair of supports, each of said supports having an aligning sleeve mounted thereon with an annular aligning pad intermediate the ends of the sleeve, bearing assemblies mounted on said supports, a rotatable shaft mounted on said bearing assemblies, a tension strut passing through said bearing assemblies and shaft and engaging said supports, means on the strut to adjust for a preloading pressure on the bearing assemblies, a second means on the strut cooperatively engaging said first means and in surface engagement with the bearing assemblies to transmit the preloading pressure thereto, said first and second means providing suitable engaging surfaces to adjust automatically for micrometric tilting of the bearing assemblies on the aligning pads in the supports and for maintaining a constant preloading pressure on the bearing assemblies over a wide range of temperature variation, said tension strut having the same rate of expansion and contraction as said shaft.

References Cited in the file of this patent

UNITED STATES PATENTS

| | | |
|---|---|---|
| 2,299,231 | Heintz | Oct. 20, 1942 |
| 2,301,700 | Heintz | Nov. 10, 1942 |